A. &. M. BARNES.
CHECK-ROW ATTACHMENT FOR CORN-PLANTERS.
No. 185,473. Patented Dec. 19, 1876.
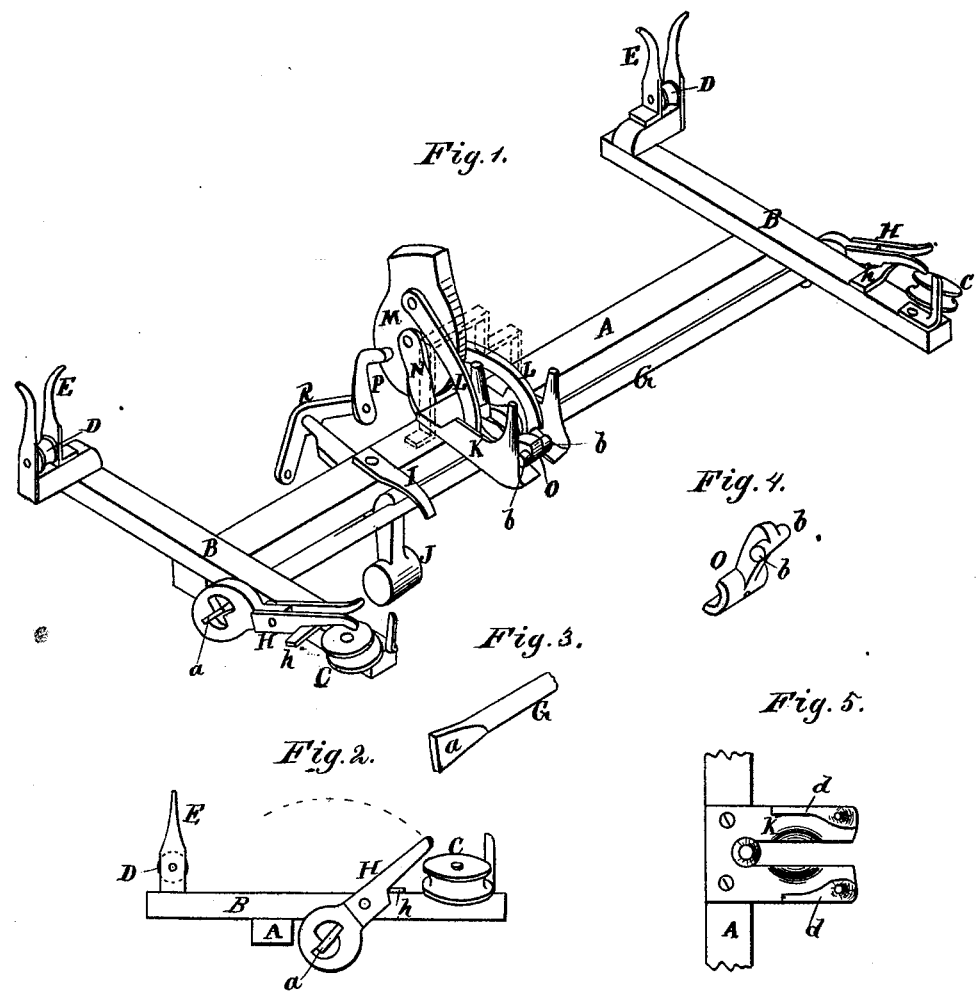
WITNESSES
INVENTORS.
Alden Barnes,
Monroe Barnes
ATTORNEYS

UNITED STATES PATENT OFFICE.

ALDEN BARNES AND MONROE BARNES, OF McLEAN COUNTY, ILLINOIS.

IMPROVEMENT IN CHECK-ROW ATTACHMENTS FOR CORN-PLANTERS.

Specification forming part of Letters Patent No. 185,473, dated December 19, 1876; application filed September 23, 1876.

*To all whom it may concern:*

Be it known that we, ALDEN BARNES and MONROE BARNES, of McLean county, and in the State of Illinois, have invented certain new and useful Improvements in Check-Row Attachments for Corn-Planters; and do hereby declare that the following is a full, clear, and exact description thereof, reference being had to the accompanying drawings, and to the letters of reference marked thereon, making a part of this specification.

The nature of our invention consists in the construction and arrangement of a check-row attachment for corn-planters, as will be hereinafter more fully set forth.

In order to enable others skilled in the art to which our invention appertains to make and use the same, we will now proceed to describe its construction and operation, referring to the annexed drawing, in which—

Figure 1 is a perspective view of our check-row attachment. Fig. 2 is a side view of the same. Figs. 3, 4, and 5 are detailed views of detached parts thereof.

A represents a wooden bar, of any suitable dimensions, provided at each end with an arm, B, extending in front and rear of the bar, at right angles therewith. These arms support, each, a front bevel guide-pulley, C, and rear friction-roller D, with chain-guard E. In suitable boxes, on the under sides of the arms B B in front of the bar A, is placed a shaft, G, the ends of which are flattened, as shown at *a*. On each flattened end of the shaft G is placed a claw or double finger, H, which is so connected to the shaft as to give the same a forward motion when operated in connection with the knotted cord or jointed wire used in check-rowers. To the shaft G is secured a weighted arm, J, and a spring, I, fastened to the bar A, works in connection therewith to give a backward motion to the shaft. On the bar A, near the center, is fastened a double cam track, K, upon which move two pawls, L L, pivoted on opposite sides of a balance-wheel, M, and on opposite sides of the center thereof, said wheel being pivoted to an arm, N, secured to the bar A. On the shaft G is further fastened a short arm, O, having a pin or projection, *b*, on each side, which arm works between and in connection with the cam-track and pawls. The cam-track K is provided with guards *d d* to keep the pawls L in position.

The cam-track is so constructed that when the arm O moves back and forth between the two parts thereof, it acts on the pawl L on one side, pushing the same backward, and the pawl on the other side then comes forward in position to receive the pin *b* on the other side of the arm.

To the balance-wheel M is pivoted a short rod, P, which is attached to a pivoted elbow-lever, R, at one end thereof, the other end of said elbow-lever working in connection with the shake or sliding bar of the corn-planter. On each arm B is a projection or stop, *h*, to hold the claw in position.

The check-row attachment thus constructed is fastened crosswise over or near the seed-boxes onto the forward part of any corn-planter. The jointed wire-chain, ordinarily used in this class of machines, is stretched across from one side of the field to the other, and is anchored to the ground with cross-bars and pulleys. This jointed chain is put onto one side of the attachment into the bevel-pulley C, through the claw H, and then in the guard E on the friction-roller D. The chain is then drawn taut and staked to the ground behind the planter. As the planter is driven forward the shoulders on the jointed chain come in contact with the claw, which causes the shaft G to turn in its bearings. The short arm O, with pins *b*, then comes in contact with and operates the pawls, balance-wheel, and elbow-lever, which opens the valves of the seed-boxes and drops the seed. The weighted arm J on the shaft turns the same with the claw back in position to receive the next joint or shoulders of the chain, and so on till the end of the chain is reached. The chain is then thrown off the attachment, the planter turned around, and the chain put on the other side of the attachment and then anchored to the ground behind the planter, as before. The planter is then driven forward, and the chain operates the attachment the same as before. The chain operates on one side of the attachment and planter in going in one direction, and on the other side in returning.

Having thus fully described our invention, what we claim as new, and desire to secure by Letters Patent, is—

1. In a check-row attachment for corn-planters, the combination of the bar A, arms B B, beveled pulleys C C, friction-rollers D D, and guards E E, substantially as and for the purposes herein set forth.

2. The combination of the double cam-track K with guards $d\ d$, shaft G with arm O, having pins $b\ b$, balance-wheel M, pawls L L, rod P, and elbow-lever R, all substantially as and for the purposes herein set forth.

In testimony that we claim the foregoing we have hereunto set our hands.

ALDEN BARNES.
MONROE BARNES.

Witnesses:
EZRA M. PRINCE,
ROBT. B. PORTER.